United States Patent [19]

Schatteman et al.

[11] 4,384,310
[45] May 17, 1983

[54] CASSETTE CHANGER APPARATUS

[75] Inventors: Etienne A. M. Schatteman; Luigi Agostini, both of Brussels, Belgium

[73] Assignee: Starr S. A., Belgium

[21] Appl. No.: 150,365

[22] Filed: May 16, 1980

[30] Foreign Application Priority Data

May 21, 1979 [FR] France .................. 79 13716

[51] Int. Cl.³ .......................................... G11B 15/68
[52] U.S. Cl. ............................................... 360/92
[58] Field of Search ........................................ 360/92

[56] References Cited

U.S. PATENT DOCUMENTS

| 3,603,597 | 9/1971 | Haake | 360/92 |
|---|---|---|---|
| 3,722,892 | 3/1973 | Haake | 360/92 |
| 3,807,741 | 4/1974 | Vermura | 360/92 |
| 3,833,224 | 9/1974 | Haake | 360/92 |
| 3,836,154 | 9/1974 | Ishikawa | 360/92 |
| 4,114,182 | 9/1978 | Zem et al. | 360/92 |

FOREIGN PATENT DOCUMENTS

| 704864 | 10/1967 | Belgium . |
|---|---|---|
| 2651489 | 8/1978 | Fed. Rep. of Germany . |
| 1562726 | of 0000 | France . |
| 1578053 | of 0000 | France . |
| 2100045 | 3/1972 | France . |
| 7108275 | of 0000 | Netherlands . |

Primary Examiner—Robert S. Tupper
Attorney, Agent, or Firm—Leydig, Voit, Osann, Mayer and Holt, Ltd.

[57] ABSTRACT

Cassette changer apparatus for a machine for recording and playing back information on magnetic tape contained in a cassette when located in an operative position. The cassette changer apparatus has a cassette storage magazine and cassette loading apparatus for transporting cassettes between the magazine and the operative position in the machine.

A turntable supports the magazine for rotation about an axis extending through the inverting axis for a cassette in the magazine, so that operating the turntable to rotate the magazine one-half revolution inverts a cassette therein and positions both sets of recording racks on tape in the cassette upon transport to the operative position for use with a mechanism providing playback and/or recording upon a single direction of tape movement. The magazine in preferred embodiment has a plurality of compartments and is translatable to bring any compartment and cassette therein to loading position. Coded elements in a band on the outer surface of the magazine are scanned by optical pick-ups to produce output signals, and control circuits use such output signals to control the magazine movement and locate a selected cassette compartment in loading position.

21 Claims, 18 Drawing Figures

FIG. 4
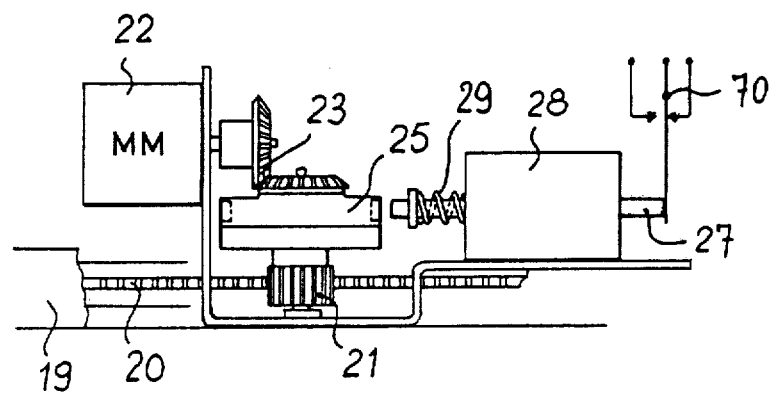
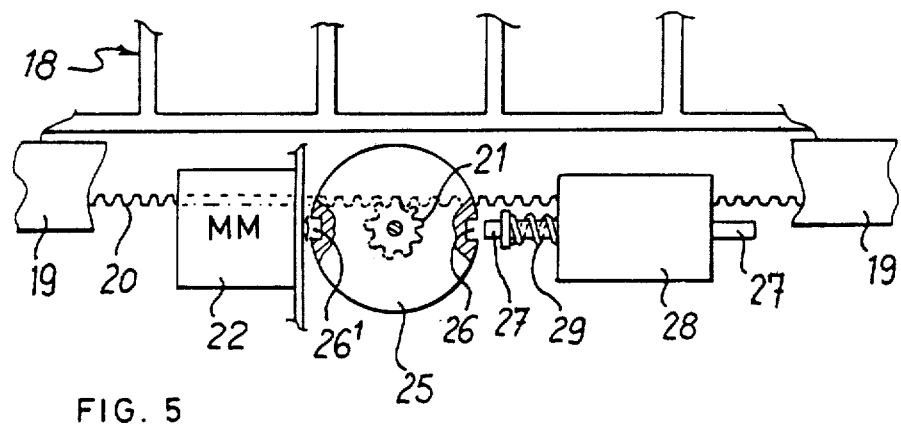
FIG. 5

CASSETTE CHANGER APPARATUS

The present invention relates to cassette changer apparatus for machines, particularly but not exclusively video machines, having tape driving means and components for recording and playing back recordings on tape within cassettes with which it has been supplied by the changer apparatus.

Such cassette changer apparatus generally comprises cassette loading apparatus which insures the placing of cassettes in the operative position and ejection, and also a cassette storage system operable to locate a cassette selected by the user in position for transport by the loading apparatus to and from the operative position in the machine.

More specifically, the present invention relates to cassette changer apparatus employing magazines for storing one or more cassettes placed on their edge, which magazines are translatable to position cassettes selectively for transport to the machine by the loading apparatus.

This application is related to co-pending application Ser. No. 138,089, entitled Loading System For Video Cassettes, which discloses the cassette loading apparatus shown in fragmentary form in the accompanying drawings. It will be understood that cassette changer apparatus constructed in accordance with this invention, preferably includes as a component, cassette loading apparatus described in said co-pending application, together with cassette storage systems and controls described herein and forming part of this invention.

Cassette changer apparatus of the general type described herein before are known, designed for bi-directional tape decks for conventional cassettes of magnetic tape for music and sound recording, i.e. performing the recording and the playing back of the tape in both its travel directions without inverting the cassette.

However, for reasons of a purely technical nature, tape decks for video cassettes containing tape for video recordings can perform these operations of recording and play back only in one tape travel direction on one set of recording tracks. It is, therefore, necessary to turn the cassette over when it is desired to use the other set of recording tracks.

Such inverting of the cassette, performed automatically, is particularly important in the case of video recorders, because the majority of them are used to record broadcasted shows in the absence of the user. The creation of such a device making it possible to utilize the total capacity of the cassette, and not only a single side (half capacity), is therefore currently of some interest.

Devices heretofore proposed for inverting cassettes of music and sound tape have been highly complex, unreliable, and in all cases known to applicants unsuited for various reasons for use in video machines.

The present invention has as its principle aim to overcome these disadvantages of prior devices, by providing cassette changer apparatus particularly well suited for video machines, including cassette storage systems having mechanism for inverting a cassette to position it for loading in the machines by revolving the cassette in a very simple motion while in a storage magazine, by revolving the magazine about a fixed inverting axis perpendicular to the cassette front edge and lying in a plane bisecting the cassette, and thereby position both sets of recording tracks for use with a single direction of tape movement, upon transport of a cassette to the operative position.

It is a further aim to provide cassette storage systems including mechanism for inverting cassettes while stored in a magazine and before transporting the cassettes by loading apparatus from the magazine to the operating components of the video machine, this cassette storage system with inverting apparatus, the loading apparatus and the controls for operating the storage system and loading apparatus, providing an automatic cassette changer particularly suited to video machines and permitting the continuous use of both sets of tracks for recording or play back, interrupted only by the ejecting and inverting cycle required to ready one set of tracks for use after the other.

In order to achieve these aims and objectives, cassette changer apparatus according to the invention incorporates cassette loading apparatus adapted to place a cassette in operative position and to eject the cassette, and a magazine for cassettes mounted on a turntable, for storing cassettes at a level immediately adjacent the loading apparatus, the loading apparatus being adapted to transport cassettes from and return cassettes to the magazine, the turntable providing for rotation of the magazine about an axis extending through the inverting axis for a cassette in the magazine, and the turntable being operable automatically to rotate the magazine one-half revolution to invert a cassette stored in the magazine.

According to a first embodiment of the invention, the magazine of the storage system has a single compartment for one cassette, and this storage system allows inverting the cassette introduced by the user.

According to a second embodiment of the invention, the magazine of the storage system has multiple compartments for a plurality of cassettes and a support providing both for rotation and translation of the magazine, together with controls permitting the magazine to be moved so that a cassette selected by the user is brought to the loading apparatus.

According to a third embodiment of the invention, the magazine of the storage system is controlled so that it is centered before being rotated, thus permitting the turntable performing the rotation to be of minimum dimensions.

Other features and advantages of the invention will become clear from the following description of the three embodiments of the invention, with reference to the accompanying drawings, wherein:

FIG. 3A is a fragmentary detailed view of components shown in FIG. 3;

FIGS. 4 and 5 are views illustrating the mechanism provided for translation of the magazine in the second embodiment of the invention, shown in FIGS. 3 and 3A;

Figure 1:
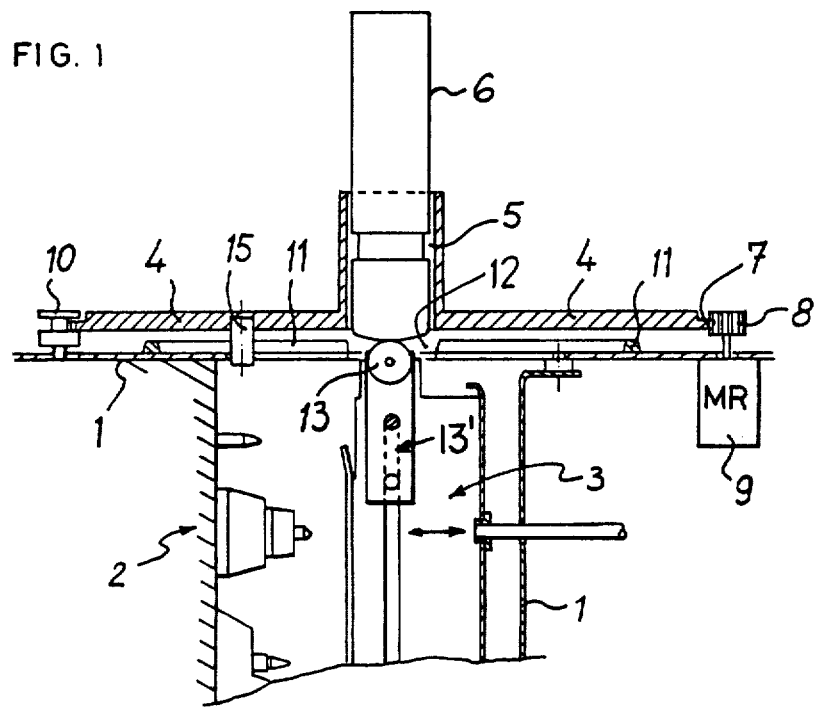
FIG. 1 is a sectional view taken substantially in the plane of lines 1—1 in FIG. 2 showing the first embodiment of the cassette changer apparatus of this invention including a single cassette magazine mounted adjacent a cassette loading apparatus.

Referring to FIG. 1, a cassette changer apparatus constructed in accordance with a first embodiment of the invention, is shown for a video machine having a fixed chassis 1 upon which is mounted a plate 2 carrying tape driving means, and recording and play-back components 2' which are schematically shown located to function on tape of a cassette when placed with said components 2' penetrating the cassette and in working association with the tape in the cassette. The machine includes cassette loading apparatus 3 mounted on the chassis plate 2, for transporting cassettes to and from the operative position in the machine, the construction and function of which are described and illustrated in the copending application Ser. No. 138,089, herein before referred to.

In carrying out the present invention, the cassette changer apparatus includes an improved cassette storage system herein shown as a magazine 5 for storing cassettes at a level immediately adjacent the cassette loading apparatus and for transfer from and return to said magazine 5 by the loading apparatus 3.

To position both sets of recording tracks on tape in a cassette for use with mechanism providing playback and/or recording upon a single direction of tape movement, the magazine 5 is supported by a circular turntable 4 which permits the magazine 5 to be rotated one-half rotation, and a cassette 6 to be inverted while in the magazine. In this first embodiment of the invention, the magazine 5 has a single compartment C for supporting a cassette 6 on its front edge and in vertical position. The magazine is supported for rotation about its central axis which coincides with a line perpendicular to the cassette front edge, and lying in a plane bisecting the cassette which is the inverting axis IA for the cassette, so that the cassette may be inverted by revolving the magazine 180° and thereby the cassette about the inverting axis IA (FIG. 2) and thereby position both sets of recording tracks for use with a single direction of tape movement, upon transport of a cassette 6 to the operative position. The turntable 4 is supported above the chassis plate 2, and is provided on its periphery with gear teeth 7 which are in mesh with a pinion 8 keyed on the shaft of the motor 9 fixed on the chassis 1 of the machine.

The motor 9 is operable to rotate the turntable 4 and thereby the magazine one-half revolution under the control of a circuit including decelerator switches 16, 16' and stop switches 17, 17' (FIG. 2) for the motor 9.

To stabilize the turntable 4 in its rotary motion, it is supported and centered by rollers 10 engaging the circumference of the turntable 4 and affixed to the chassis 1.

While the above-noted co-pending application Ser. No. 138,089 may be referred to for details of the loading apparatus 3, it generally comprises, as shown in FIG. 1, a cassette transport mechanism including a carrier 13' having rollers 13 on which the front edge of the cassette 6 rests. The cassette transport carrier 13' is movable vertically downward when the apparatus is arranged with the vertical orientation illustrated in FIG. 1, such that the cassette is transported inward front edge first in its own plane within a housing 3', the transport mechanism being guided by slots in the walls of the housing 3' to transport the cassette to an intermediate position opposite the tape driving means and play back and recording components 2' of the video machine. By power means acting on the shaft 278, the housing 3' is moved toward the tape driving means to carry the cassette into operative position with the tape driving means and other components 2' penetrating the cassette in working association with the tape contained therein, and which comprise mechanism for playback and/or recording upon a single direction of tape movement by said tape driving means.

The cassette loading apparatus is further operable under control of circuit means, to eject the cassette 6 from and return it to the magazine 5, the return movement being the reverse of the path followed by the cassette 6 in its transport from the magazine 5 to the operative position.

Thus, a cassette 6 in the compartment C of the magazine 5 drops through the open bottom of the compartment C and is carried by the transport carrier 13' downward through an aperture 12 in the video chassis, aligned with the open bottom of the magazine 5, into the housing 3' of the loading apparatus. On the upper surface of the chassis 1 below the turntable 4, there are fixed guides 11 in the form of circular rails terminating on each side of the aperture 12 and the open bottom of the magazine compartment C. Said guides 11 are intended to support the front edge of the cassette 6 during its rotation while the magazine 5 is rotated and to insure the cassette 6 remains at its storage level throughout the rotary movement.

The aperture 12 in the video chassis 1 has a rectangular section slightly larger than the front edge of a cassette so that a cassette passes freely through the aperture, and a semi-circular segment 14 (FIG. 2), allowing clearance for movement of a stud 15 fixed to and extending below the turntable 4. The stud 15 functions to allow movement of the turntable 4 in its rotation through one-half revolution and to stop the turntable 4 at the limits of that movement. Also provided, as above noted, are decellerator switches 16, 16' and stop switches 17, 17' for controlling the drive motor 9 for the turntable 4. Their arrangement insures a slow down of the motor 9 upon tripping the decellerator switch 16 or 16' and stopping the motor 9 upon engagement by the stud 15 with the stop switch 17 or 17'. Preferably the voltage at the terminals of the motor 9 is reduced upon the stud 15 engaging the decellerator switch 16, to reduce motor speed, which is stopped upon engagement with the stop switch 17 or 17' by the stud 15. The loading apparatus 3 is operated responsive to the closing of the switch 17, to begin its operation to transport the cassette 6 from the magazine 5 to the operative position within the video machine.

Figure 2:
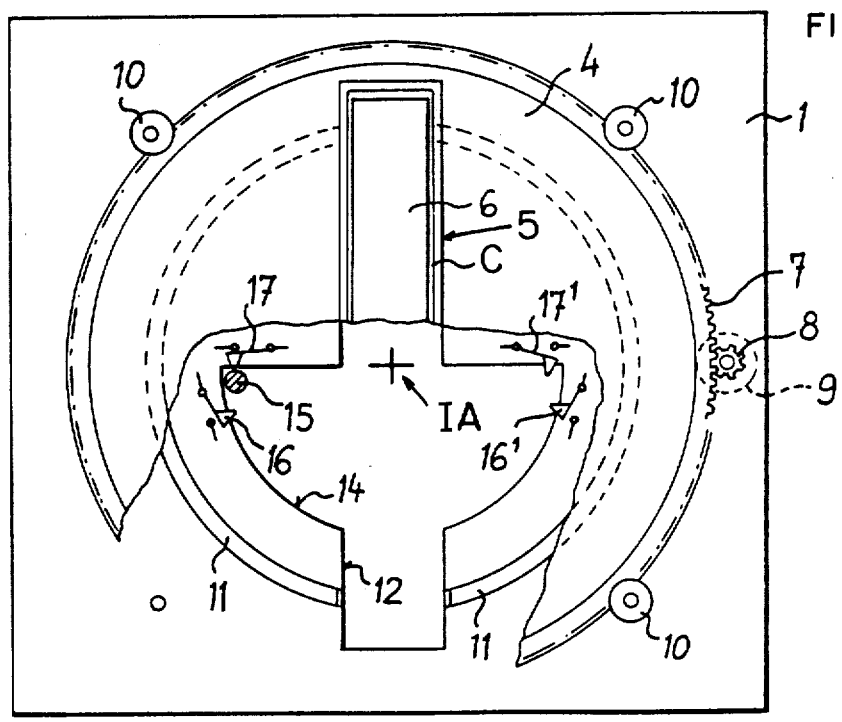
FIG. 2 is a corresponding view in plan.
Figure 3:
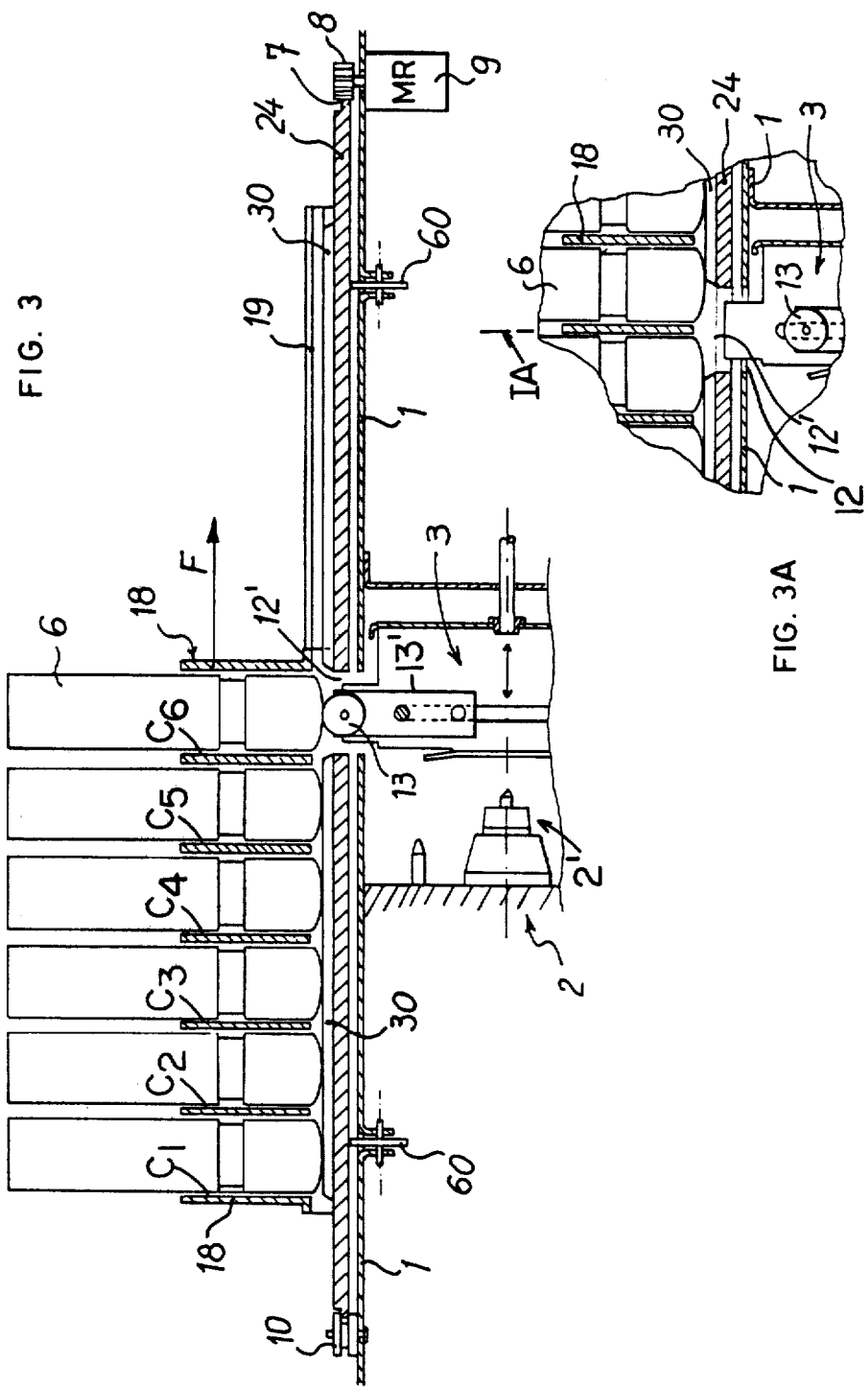
FIG. 3 is a sectional view, similar to FIG. 1, showing a second embodiment of the cassette changer apparatus according to this invention and including a multiple cassette magazine.

While in the first embodiment of the invention illustrated in FIGS. 1 and 2 a cassette storage system is provided for a single cassette which is inverted by rotation of the magazine, to position both sets of recording tracks on tape in the cassette for use with mechanism providing playback and/or recording upon tape movement in a single direction, in the second embodiment of the invention shown in FIGS. 3 and 3A, a cassette storage system is provided for multiple cassettes, with provision for inverting cassettes by rotation of the magazine.

As in the video machine illustrated in FIG. 1, in FIG. 3 the machine comprises a fixed chassis 1, a plate 2 carrying tape driving means and recording and playback components 2', and a cassette loading apparatus 3 of the type, for example, shown and described in the previously referred to co-pending application. Also included, in carrying out the present invention, is a magazine 18 having six compartments C1 to C6 for cassettes 6 each compartment having an open bottom, the magazine being mounted on a circular turntable 24. The turntable 24 is supported by rollers 60 fixed to the chassis 1 and rollers 10 also fixed to the chassis 1 and supporting and guiding the turntable by engaging it on its circumference. Due to the size of the turntable 24, it is desirable to provide the intermediate support of the rollers 60. The turntable 24 is driven by means herein shown as a system of teeth 7 at the periphery engaged by a pinion 8 keyed on the shaft of the motor 9 mounted on the chassis 1.

In order to position a compartment of the magazine 18 over an aperture 12' in the turntable 24, the magazine 18 is mounted for translation by means of parallel rails 19 situated at each side of the magazine 18 and guiding the magazine in its movement of translation as indicated in the arrow F in FIG. 3. A cassette loading apparatus 3 is located immediately below the aperture 12' in the turntable so that it is operable to transport a cassette 6 from one of the compartments of the magazine 18 to the operative position within the video machine, and to return the cassette to the magazine.

On the surface of the turntable 24 are cassette support rails 30 situated between the magazine guiding rails 19 and parallel thereto, and extending across the open bottom of each compartment of the magazine, to provide for support of the cassettes at their storage level as the magazine 18 is moved in translation on the surface of the turntable.

For translating the magazine 18, one of its lateral sides (FIGS. 4 and 5) carries a rack 20 which cooperates with a gear 21 driven by a drive motor 22 through bevel gears 23. The drive motor 22 is fixed on the turntable 24.

One revolution of the gear 21 corresponds exactly to the distance by which the magazine 18 must be moved from compartment to compartment, to locate each cassette in the magazine 18 over the loading apparatus 3 for transport to the operative components of the video machine.

For controlling the sequential movement of the magazine 18 to position it exactly with one of its compartments C1 to C6 above the aperture 12 and thus locate the cassettes properly for transport, on the same shaft coupling the drive gear 21 and bevel gear 21' there is fixed a wheel 25 having on its circumference an aperture 26 adapted to receive a plunger 27 of an electromagnet 28, under the urging of a spring 29.

For controlling the sequential movement of the magazine 18, when the drive motor 22 is operated, the electromagnet 28 is energized so as to release the wheel 25, and to stop the gear 21 after one-half revolution, the electromagnet 28 is de-energized, releasing the plunger 27 which slides on the periphery of the wheel 25 and enters the aperture 26 as the wheel 25 is rotated. Simultaneously, the plunger 27 opens the switch 70 (FIG. 4) which de-energizes the motor 22 and stops the translation of the magazine. Manual movement of the magazine 18 is also prevented by the interlock between the plunger 27 and the aperture 26.

In the operation of the cassette storage system, it is preferred that before the turntable 24 is rotated to invert a cassette 6, the magazine 18 be shifted so that two half-cassettes are positioned above the aperture 12', as shown in FIG. 3A. Each of these two cassettes rests partly on the support rails 30 and is therefore maintained at the storage level, to prevent any cassette from slipping into the aperture 12' in the turntable 24 while the rotation is in progress.

When the magazine shifting is complete, the rollers 13 of the tape transport mechanism are caused to descend slightly so that they do not interfere with the elements of the turntable 24 during the rotation of the latter.

The provision of locating the two half-cassettes over the turntable aperture 12' ensures that no cassette leaves its storage level to be introduced into the aperture 12 and either slide in the housing 3' or rest upon the chassis 1, which would block the rotary movement of the turntable and magazine and seriously damage the machine or the cassette itself.

In order to so locate the two half-cassettes, the wheel 25 includes a second peripheral aperture 26' diametrically opposite the aperture 26; the terminals of the electromagnet 28 are disconnected from the supply voltage immediately after the plunger 27 has released the wheel 25. Consequently, after the drive gear 21 has executed one-half revolution and the magazine 18 is positioned so that the wall between adjacent compartments is centered over the aperture 12, as indicated in FIG. 3A, with the magazine 18 so located, the drive motor 9 for the turntable is then energized so that the turntable 24 executes one-half revolution to invert all the cassettes in the magazine. It will be seen that the inverting axis IA for the cassettes, in this case and also in the case of the third embodiment of FIGS. 6-8, is the rotational axis of the turntable 18 as shown in FIG. 3A, and extends adjacent a cassette 6 rather than intersecting a cassette 6 as in the first embodiment of the invention shown in FIGS. 1 and 2.

In a similar manner to the control means for the turntable illustrated in FIG. 1, the aperture 12 in the chassis 1 may be provided with a semi-circular segment 14 as indicated in FIG. 2, and a stud 15 may be provided on the underside of the turntable 24 (as shown in FIG. 2, but not shown in FIG. 3) for action upon decellerator switches 16, 16' and stop switches 17, 17' located as indicated in FIG. 2 but serving the mechanism of FIG. 3, such decellerator and stop switches being included in a control circuit for the drive motor 9 for the turntable 24 to control its motion through one-half revolution and stopping it at the end of the stroke.

Figure 6:
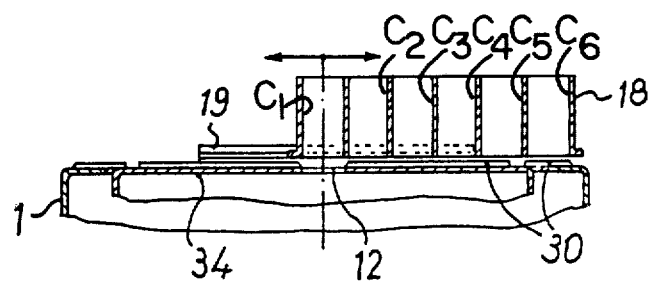
FIGS. 6, 7 and 8 are views illustrating the multiple cassette magazine with provision in the control system for centering the magazine, according to the third embodiment of the invention.
Figure 7:
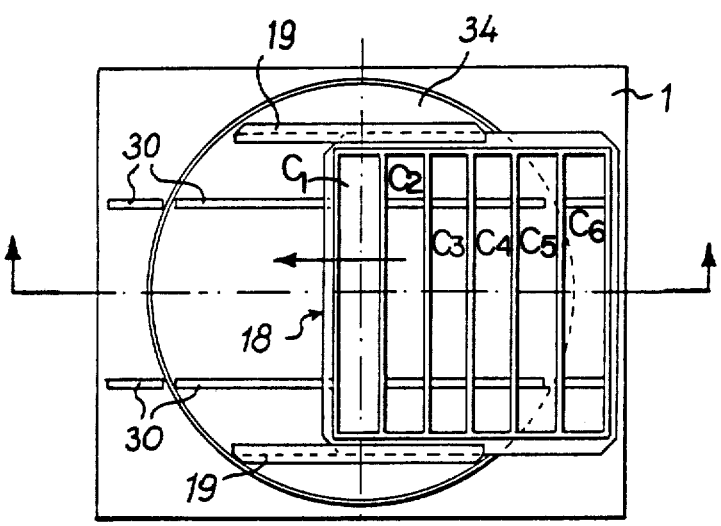
Figure 8:
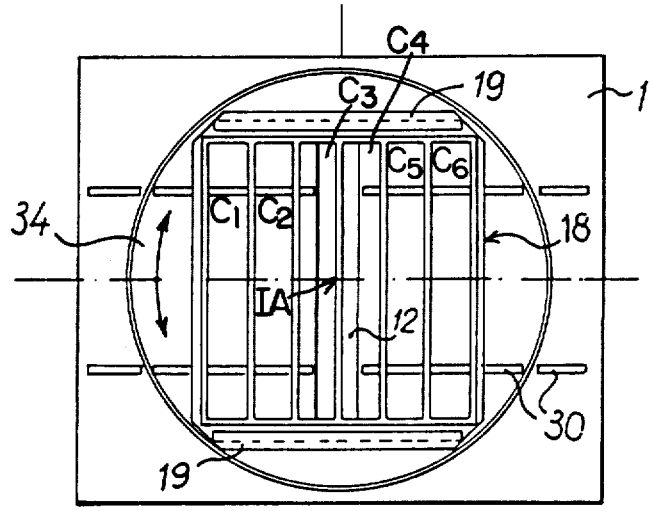

Now turning to FIGS. 6, 7 and 8, a cassette storage system employing the invention is shown in a third embodiment, providing the advantage, as compared with the embodiment of FIGS. 3 and 3A, that the turntable diameter is reduced, so that the cassette changer apparatus may be fitted within a more compact space.

This embodiment is based on the principle that whenever the magazine 18 is required to execute a one-half revolution, it is first automatically centered, as indicated in FIG. 8, on the turntable 34. Thus the diameter of the turntable 34 can be reduced to a minimum, herein shown as substantially the diametrical dimension of the magazine 18.

While not shown in FIG. 6, it will be understood that a cassette loading apparatus similar to that illustrated in FIG. 3 and preferred to be of the type described and shown in the above referred to co-pending application, will be located below the chassis 1 with the cassette transport mechanism immediately below aperture 12 in the plate 1.

The turntable 34 is mounted on the fixed chassis 1 for rotation, and is equipped with rails 19 between which the magazine 18 is guided in translation. Guides 30 on the upper surface of the turntable 34 support the lower front edges of the cassettes 6 housed in the compartments C1 to C6 of the magazine 18, and maintain the cassettes at their storage level as the magazine 18 is translated. The bottom of all compartments C1 to C6 of the magazine 18 are open so as to allow a cassette in a compartment located over the aperture 12 to pass downwardly through the aperture 12 be carried by the loading apparatus 3 to the operative position in the video machine. While means are not shown for supporting and driving the turntable 18 in its rotary movement, such means are preferably provided of the type illustrated in FIGS. 1 and 2 and, similarly, means are provided for driving the magazine 18 in translation of the type provided in FIGS. 4 and 5. The compartments C1 to C6 provided in the magazine 18 will preferably be even in number, so that the centering position of the magazine 18 referenced to the turntable 34 results in the positioning of two half-cassettes opposite the aperture 12.

CONTROL CIRCUIT (FIGS. 9, 9A, 9B, 10, 10A, 10B, 10C, 10D)

In carrying out the invention, in order to control the operation of the cassette changer apparatus here-in-before described, control circuit and operating means is provided herein shown particularly suited for a cassette changer apparatus with a cassette storage system of the kind illustrated in FIGS. 6, 7 and 8 which is the most preferred form of the invention.

Figure 9:
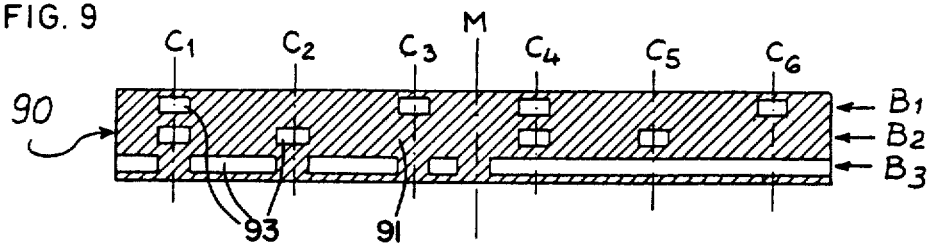
FIGS. 9, 9A, 9B show coding and code reading devices for identifying the locations of compartments in the magazine.
Figure 9A:
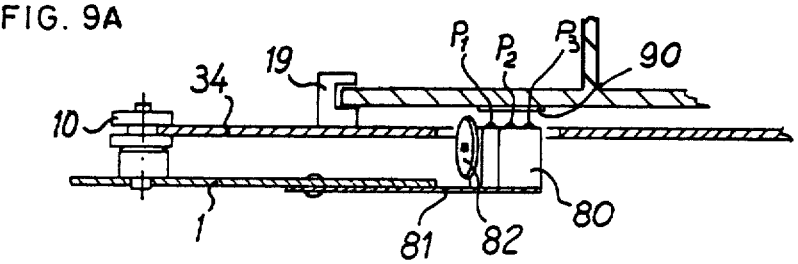
Figure 9B:
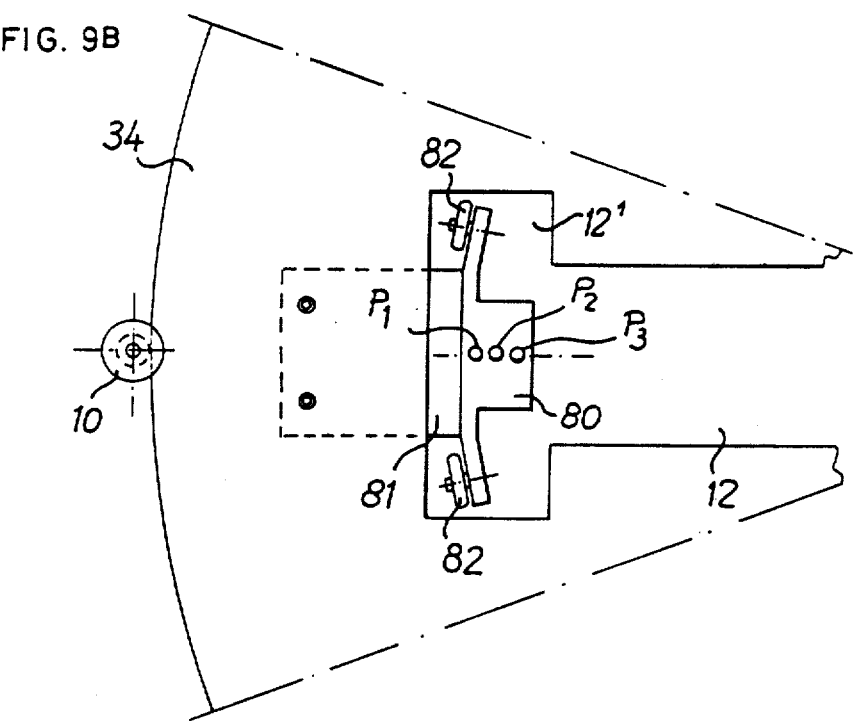

Referring to FIGS. 9, 9A and 9B, means are illustrated for sensing the location of the magazine 18 and controlling its translatory movement. For this purpose, the bottom wall of the magazine 18 has on its lower face, a band 90 for marking the locations of the compartments. The band 90 includes opaque zones 91 and reflecting zones 93 (FIG. 9) which represent in binary code the locations of the six compartments (C1 to C6) and the center M of the magazine.

The band 90 is divided into three bands, B1, B2 and B3, both of opaque and reflecting zones 91, 93 to represent in simple binary code the seven locations involved in a six compartment magazine, and the bands B1, B2 and B3 are scanned by optical pick-ups P1 to P3. For example, if an opaque zone is a "0" and a reflecting zone is a "1", M is represented by the binary code 000, C3 by 100, C2 by 010, etc., reading from B1 to B3.

In order to read the bands B1, B2 and B3 on the underside of the turntable, the optical pick-ups P1 to P3 are mounted on a block 80 (FIGS. 9A, 9B) attached to the chassis 1 of the machine by means of a leaf spring 81 tending to maintain the block in the raised position shown in FIG. 9A, in which it projects through the segment 12' of the window 12 in the turntable. The block is cammed away from interference with the turntable when the turntable 34 is pivoted through one-half revolution. For this purpose the block 80 is moved by rollers 82 carried by the block 80 which are engaged by the edge of the window segment 12' and move the block downwards so as to prevent any mechanical interference during rotation, which might damage the pick-ups. When the rotation is performed the edge of the window 12' releases the rollers 82 and the block 80 under the influence of the spring 81, is raised to a position beneath the band 90 for reading the coding marked therein.

Figure 10:
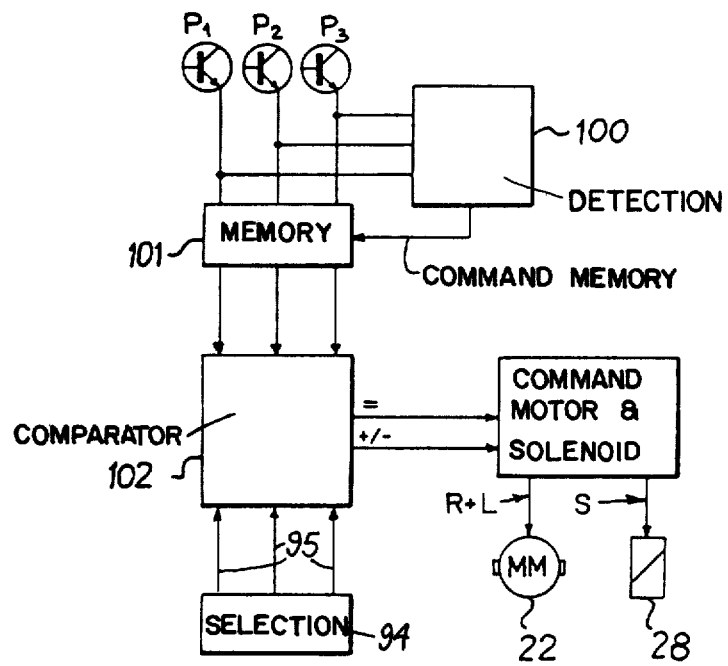
FIG. 10 is a block diagram of control circuits for the cassette storage system of the cassette changer illustrated herein.
Figure 10A:
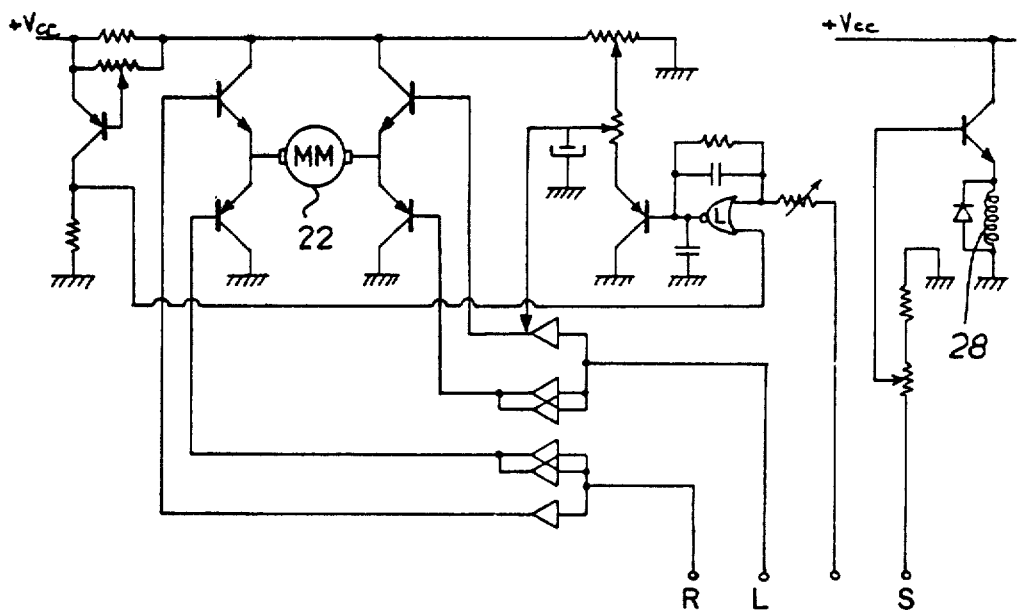
FIG. 10A is a schematic diagram of the control circuit for the magazine drive.

For sensing the compartment locations and operating the magazine 18 the pick-ups P1, P2 and P3 are connected in a circuit schematically illustrated in FIG. 10 and 10A.

In carrying out the invention, control means are provided for selecting a cassette located in a particular compartment in the magazine 18 and position the cassette over the aperture 12 for transport by the loading apparatus to the operative components of the machine. As shown, the cassette selecting process is conveniently carried out by circuit means shown in FIGS. 10 and 10A, including a selection circuit which may be manually operated as by set of push buttons or keys 94 to produce by selective energization of the conductors 95 a binary representation of the selected compartment in the magazine. An output signal from the pick-ups P1 to P3 is passed to a first circuit 100 intended to detect the transition between coded zones and to operate the memory circuit 101 to store the binary coded signal representing the compartment located opposite the aperture 12 as the magazine is moved to shift compartment by compartment past the aperture.

A comparator circuit 102 compares signals received from the memory 101 on the conductors 110, which by their selective energization represent the coded binary signals stored in memory, with signals from the selection circuit on the conductors 95. During an operation of moving the magazine 18 to select a compartment and cassette therein for transport to the operative components of the video machine, the motor 22 (FIGS. 4, 5 and 10A) driving the magazine 18 is controlled by signals over the line L or R to translate the magazine in one direction (left) or the other (right) according to the sign of the result given by the comparator circuit 102, which compares the coded signal for the compartment selected with the coded signal representing the compartment location opposite the aperture 12. When the comparison shows the coded signals are the same, solenoid 28 (FIGS. 4, 5 and 10A) is released and its plunger 27 enters the aperture 26 of the wheel 25 in order to stop the further motion of the motor 22 and latch the magazine precisely in position with the designated compartment over the aperture 12.

In the process involving rotation of the turntable and magazine in order to invert a cassette, the selection circuit is utilized to designate the position "M" (FIG. 9) which represents the centering of the magazine 18 required before rotation can start. As the magazine approaches the position "M" the plunger 27 of the solenoid 28 is released and enters the aperture 26' of the wheel 25, in order to stop the magazine precisely in its centered position with two half-cassettes located over the aperture 12.

Figure 10B:
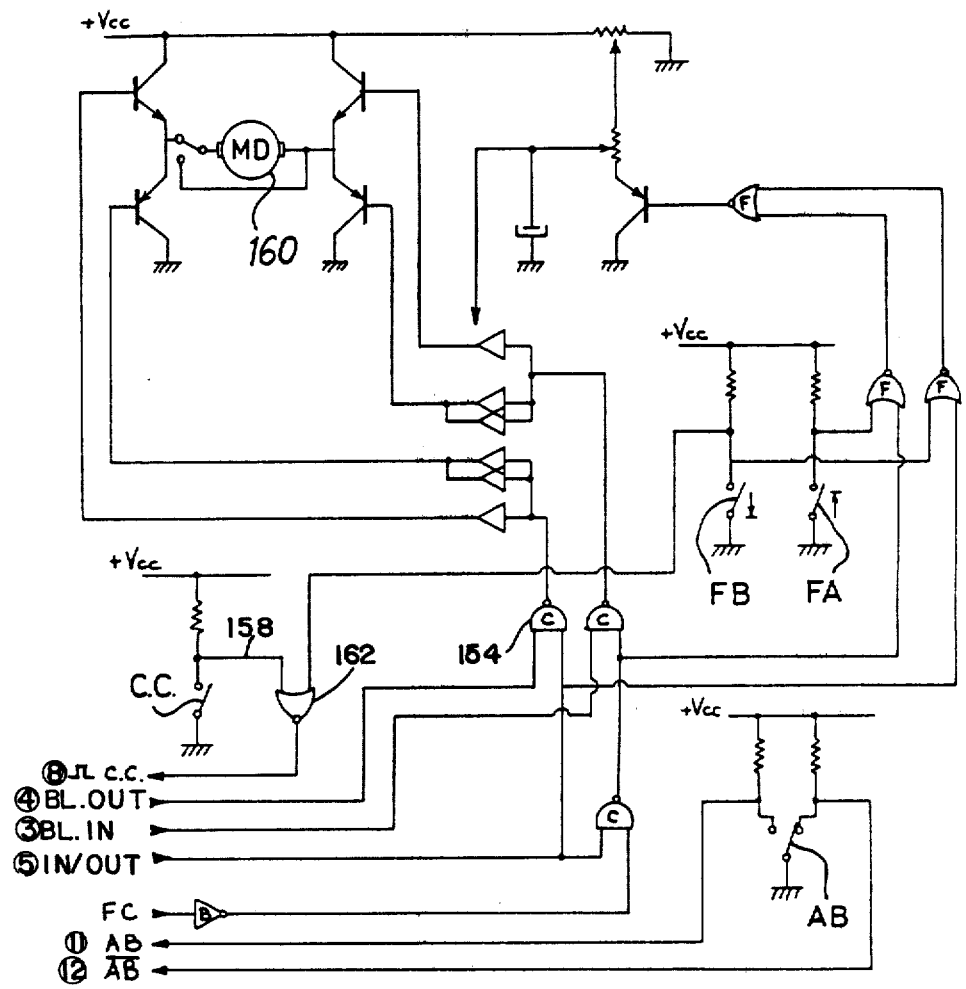
FIG. 10B is a schematic diagram of the control circuit for the cassette loading apparatus.
Figure 10C:
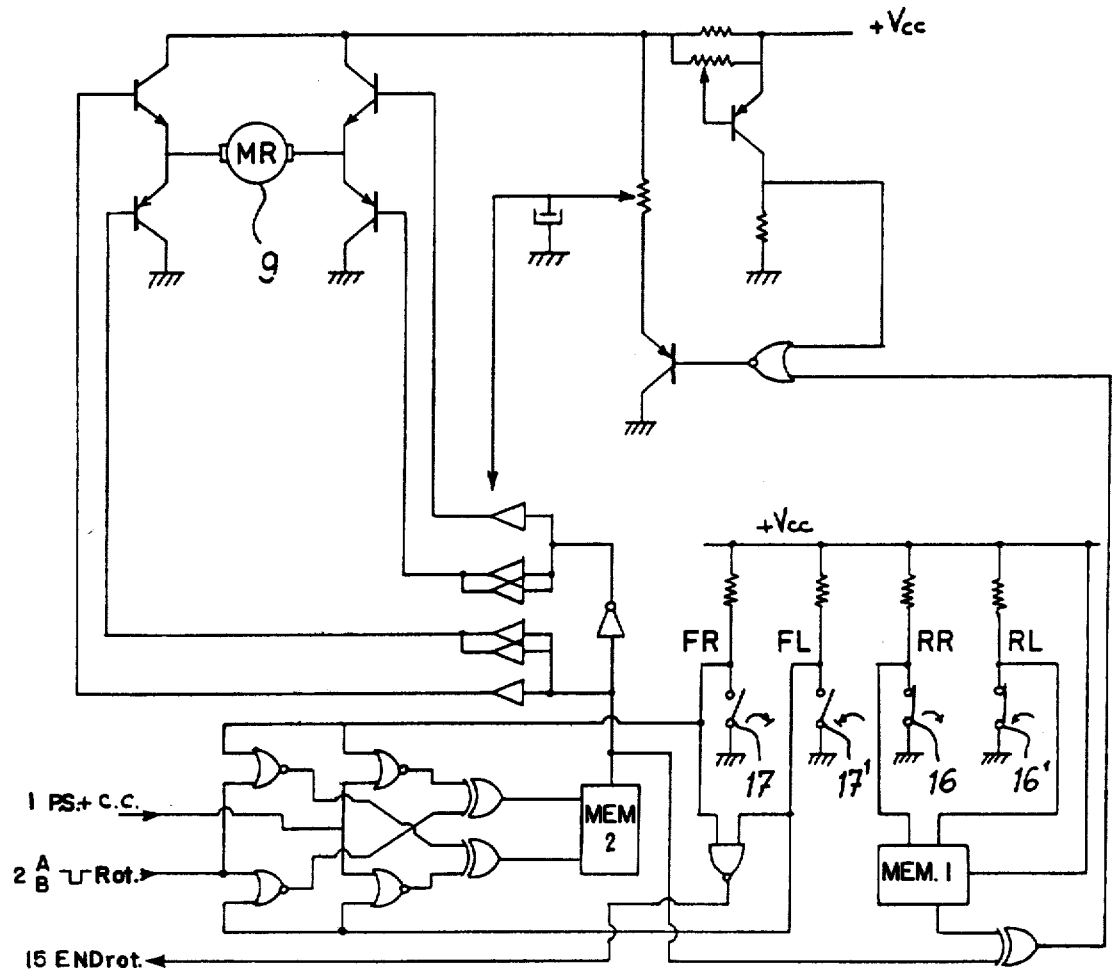
FIG. 10C is a schematic diagram of the circuit controlling the magazine rotation motor.

Before the turntable is rotated, to prevent interference with the rollers 13 of the cassette transport mechanism which normally projects through the aperture 12 in the turntable, the carrier 13' of the cassette transport mechanism is lowered slightly. This is preferably achieved with the circuit illustrated in FIG. 10B, which controls the motor MD (160) which raises and lowers the carrier 13' of the cassette transport mechanism. Two switches FA, FB, shown in FIG. 10B, are actuated at the top and bottom end of the full stroke of the cassette transport mechanism, in order to insure that the operation of descent or ejection has been performed completely and to reduce the voltage applied to the motor MD to the holding value. When the inverting of cassettes is commanded and the magazine 18 is centered, the motor MD (160) is energized from the source $V_{c.c.}$ to effect a slight descent of the support rollers 13. Responsive to the actuation of a switch AB (FIG. 10B) upon such slight descent of the support rollers 13 and carrier 13', the supply voltage to the motor MD is cut off and the motor 9 (MR) is started (FIG. 10C), which is the drive motor for rotating the turntable and magazine 18. The motor 9 (MR) commences to rotate either to the left or to the right, depending on the state of the end of stroke switch FR or FL (corresponding to the stop switches 17, 17' FIG. 2) one of which is engaged by the stud 15 on the underside of the turntable at the end of its stroke of one-half revolution. The normally closed switches RR and RL (corresponding to the decelleration switches 16 or 16' FIG. 2) effect the decelleration of the motor 9 by reducing its supply voltage when opened by the stud 15, as can be seen in the circuit of FIG. 10C.

When the magazine has been fully rotated, and a selected cassette therein inverted, the motor MD (160) is operated to return the carrier rollers 13 to the cassette storage level. The end of stroke switch FA (FIG. 10B) is then actuated. When the magazine is translated, with each of the compartments having an open bottom, the bottom edge of each cassette engages and is supported by the rollers 13 of the carrier 13' and the cassette thereby prevented from falling through the aperture 12. It is important, therefore, that after the carrier 13' is lowered clear of the magazine to allow the magazine to be rotated without interference, that it be raised to its up position before the magazine is translated. The magazine positioning circuit (FIG. 10A) is energized to effect the movement of the magazine to place the compartment (C1 to C6) containing the selected cassette over the aperture 12.

When the magazine has been so positioned, the cassette is then transported to the operative position in the machine by the transport mechanism 3. As previously noted, no movement during cassette selection or loading is performed before the previous motion of any component has been completed; every step is sequential, one movement does not start until the prior movement has completed.

To this end there is provided in the control circuit of FIG. 10B, a switch C.C. the purpose of which is to check whether the magazine compartment designated by the selection circuit in fact contained a cassette and whether the cassette had been correctly inserted by the user in the compartment with its front edge at the bottom.

Figure 11:
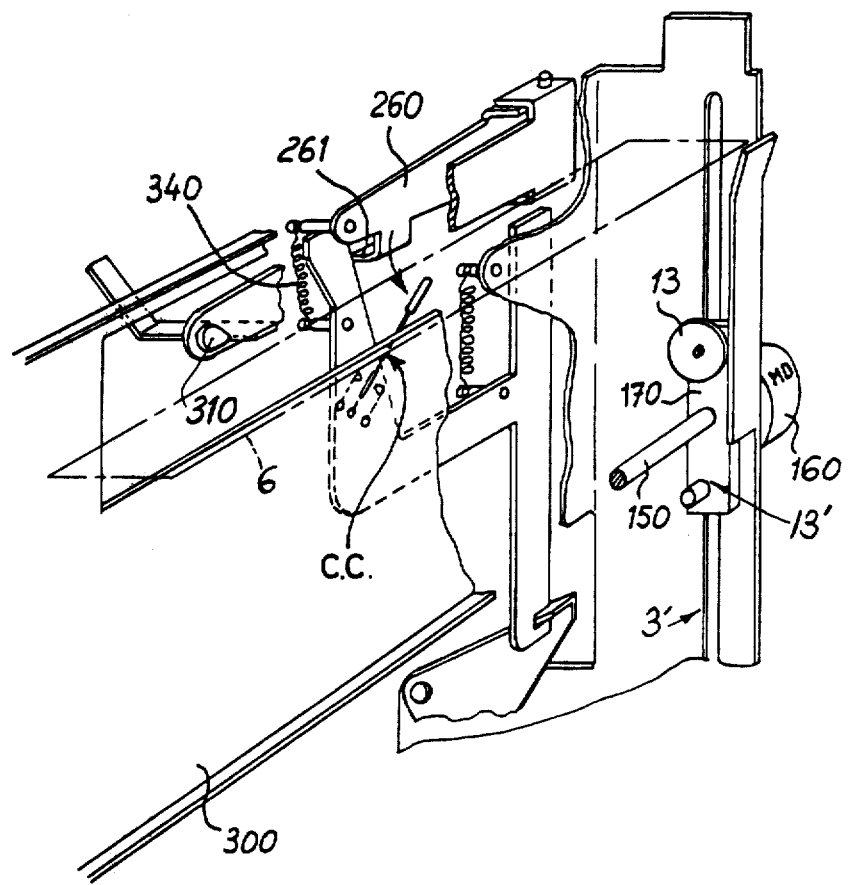
FIG. 11 is a fragmentary detailed view of the cassette loading apparatus.

The switch C.C. is located, as indicated in FIG. 11, on a plate 300 in the housing 3' of the cassette loading apparatus 3. The cassette loading apparatus 3 is described in detail in co-pending application Ser. No. previously referred to, to which reference may be made for further details. As indicated in FIG. 11, the switch C.C. is mounted to be engaged by the finger 261 extending from a lever 260 of the apparatus, upon counterclockwise motion of the lever 260 far enough to bring the finger 261 into engagement with the switch C.C.

In the normal operation of the cassette transport apparatus 3 to transport a cassette from the magazine 18 to its intermediate position in the housing 3', the cassette will be located adjacent the plate 300 as generally indicated in phantom lines in FIG. 11, and the lever 260 and particularly the finger 261 carried thereby will be prevented from engaging the switch C.C. and actuating it when a cassette is properly positioned in the cassette loading apparatus and being carried thereby through its path to operative position in the machine. Thus, if the housing 3' of the loading apparatus 3 contains a cassette, and if the latter is correctly positioned, the switch C.C. will not be actuated and the normal sequence of operation of the cassette loading apparatus will take place.

If a cassette has been incorrectly introduced or if the housing 3' simply does not contain a cassette, the spring 340 draws the lever 260 to its maximum stroke and the latter closes the switch C.C. When the cassette carrier 13' arrives at the end of its stroke and closes the switch FB (FIG. 10B), the motor MD (160) is reversed so as to return the cassette carrier 13' to its top position and the components are ready to receive a properly inserted cassette in the magazine.

It should be observed that the motor MM (FIG. 10A) for translating the magazine is supplied with a regulated voltage so that the linear speed of the magazine is entirely independent of its load. Therefore the optical reading and the control of the magazine always occur with the same precision.

SUMMARY OF OPERATION

In order to describe a cycle of operation, suppose that the user has programmed the apparatus, through a conventional keyboard and the selection circuits 94, to record cassette 2 side B and cassette 5 side A, and that cassette "2-B" is being recorded. The following description will cover the return of cassette 2 to the magazine which is positioned with compartment C2 over the loading apparatus, the inverting of the cassette 5 in compartment C5 to position the set of tracks of side A for use with the recording mechanism, the translation of the magazine to locate compartment C-5 over the loading apparatus, and the transport by the loading apparatus of cassette 5 (with side A positioned for recording) to the operative position in the video machine.

With the set of tracks of side B of cassette 2 being used for recording, when the end of the tape is detected by circuit means of the tape deck, an "end of tape" pulse is delivered over line 7 (FIG. 10D) to the cassette changer control circuit, which in response to this pulse operates the cassette transport mechanism to return the cassette to the magazine. The "end of tape" pulse on line 7 (FIG. 10D) via the NOR gate 150, NAND gate 152 and memory device Mem. 3, provides a pulse over lines labelled IN/OUT 5 in FIG. 10D and FIG. 10B. Responsive to the IN/OUT pulse, BL OUT pulse is produced which is used to power the drive motor (not shown) for moving the housing 3' horizontally to remove the cassette 2 from operative position to its intermediate position. Referring to FIG. 10B, pulses on both IN/OUT line 5 and BL. OUT line 4 delivered through the NAND gate 154 cause operation of the transport mechanism motor MD (160) in the appropriate direction of rotation to raise the cassette from the intermediate position and return the cassette to the magazine. When the cassette is fully returned to the magazine, the switch FA (FIG. 10B) is actuated by the loading mechanism in its up position to stop the motor MD (160) and permit the next operation which is the translation of the magazine.

The selection circuit (FIG. 10) is also made operative in response to actuation of the switch FA. Since the magazine is to be rotated to position the set of recording tracks on side A of cassette 5 in position for use with the recording and/or playback mechanism, the magazine is first translated to its centered position "M". The solenoid S (28) is then pulled in to allow the magazine to rotate.

When the centered position "M" has been reached, a ⎴⎳ pulse "Com. Rot." is delivered on line 14 (FIG. 10D), and once the cassette transport motor MD (160) has lowered the carrier 13' and rollers 13 clear of the magazine so as not to interfere with its rotation, the switch AB (FIG. 10B) is actuated to its AB state providing a pulse ⎳⎴ on line 11 (FIG. 10D) which ORed with a "Com. Rot." pulse ⎴⎳ on line 14 produced an " ⎴⎳ Rot." pulse on line 2. This " ⎴⎳ Rot." pulse on line 2 (FIG. 10D) is carried (FIG. 10C) to the circuit for operating the magazine rotation motor MR (9) and causes the motor to rotate the magazine. When the magazine has been rotated one-half revolution, one of the end of stroke switches (17 or 17¹) delivers a pulse "End Rot." on line 15 which causes the transport mechanism drive motor MD (160) to operate and raise the carrier 13' to its up position, actuating a switch FA (FIG. 10B) and shifting the switch AB to its $\overline{AB}$ state.

The comparator circuit 102 is then operative to pull in the locking solenoid S (28) and release the locking pin so that the magazine is movable. This circuit is operative to compare the selected position of compartment C5 with the present position "M" of the magazine and produce an output conveyed over the right "R" or left "L" lines (FIG. 10A) to operate the magazine translation motor MM (22) in the appropriate direction to locate the compartment C5 in position over the loading apparatus. The solenoid S (28) is also deenergized to engage the locking pin to lock the magazine during the cassette loading and return operation.

Figure 10D:
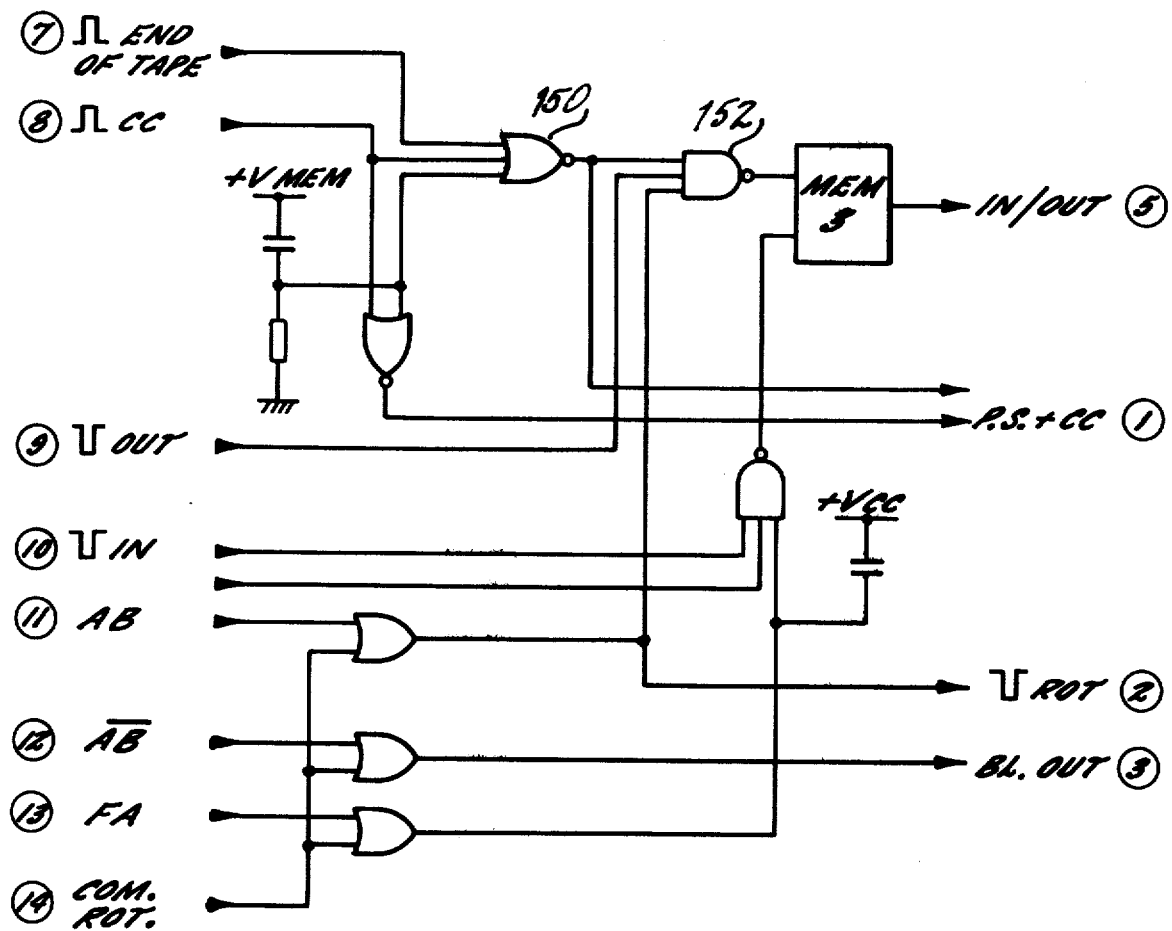
FIG. 10D is a schematic diagram of a portion of the control circuit.

Once the selected cassette compartment C5 is exactly located over the loading apparatus, a pulse ⎳⎴ IN is delivered on line 10 (FIG. 10D) which via the NAND gate 153 and memory device Mem. 3 produces an IN/OUT pulse on line 5 (FIG. 10D and FIG. 10B). Referring again to FIG. 10B, pulses on both line 5 and line 3 cause the operation of the cassette transport dirve motor MD (160) to move the transport carrier in the direction to load the cassette in compartment C5 into the video machine. The cassette is lowered in the housing 3' of the transport mechanism to its intermediate position, and a drive means (not shown) is then actuated by a pulse BL IN to move the housing and cassette horizontally toward the tape drive means and play-back and/or recording components 2' of the video machine to place the cassette in operative relation therewith in its operative position.

Part of the transport mechanism to carry the cassette fully to its intermediate position in the housing 3', referring to FIG. 11, includes the linkage 156 which is driven down by the final inward movement of the transport carrier 13'. With a cassette present and properly located in the housing 3' with its front edge at the bottom, downward movement of the linkage 156 carries the arm 250 and the arm 260 downward, and the pin 310 on the arm 260 into engagement with the cassette 6 (indicated generally in phantom lines in FIG. 11) to move the cassette downward fully into its intermediate position. With the linkage limited in its downward movement by reason of engagement with the cassette, the finger 261 extending horizontally from the arm 260 is prevented from actuating a check switch C.C. mounted on the wall 300 of the housing 3' having states representing the presence or absence of a cassette being transported toward the operative position and also signalling that a cassette is improperly positioned, for example, front edge at the top upon its actuation by the finger 261 on the arm 260.

Accordingly, now referring to FIG. 10B, normally a "1" or high voltage is on line 158; if the cassette has not been correctly inserted or if there is no cassette present, actuation of the switch C.C. produces a "0" or low voltage pulse on line 158 to the NOR gate 162; when the carrier 13' completes its full down stroke and actuates switch FB, that produces a "0" on line 164 to the NOR gate 162, resulting in a "1" on the output line 8 represented in FIG. 10B as ⎳⎴ C.C. As will be seen from FIG. 10D such a pulse on line 8 via the NOR gate 150, NAND gate 152 and memory device Mem. 3 produces an IN/OUT pulse on line 5 which causes reversal of the transport motor MD and return of the transport carrier 13' to its up position adjacent the magazine.

With a cassette present in the apparatus, where the check switch C.C. is not actuated and the cassette is lowered fully to its intermediate position, at the end of this movement the carrier 13' actuates the end of stroke switch FB for delivering a pulse "BL-IN" on line 3 operative to connect power to the motor (not shown) employed to shift the housing 3' and cassette carried therein horizontally from the intermediate to the operative position to engage the cassette in operative relation with the tape drive means and playback and/or recording components 2' of the video machine. Then the tape deck is automatically switched back into "RECORDING" mode of operation.

We claim:

1. In a machine having mechanism for recording and/or playing back information on magnetic tape contained in a cassette when loaded in an operative position, upon movement of the tape in a single direction; cassette changer apparatus comprising (1) cassette storage means including a magazine having a compartment for storing a cassette and (2) cassette loading apparatus for transporting a cassette to and from said compartment in said magazine and said operative position; said machine including a chassis and a rotatable turntable on said chassis for said magazine, and (3) means for rotating said turntable and magazine one-half revolution about an inverting axis for a cassette in said compartment of said magazine to position both sets of recording tracks on tape in the cassette for use with said mechanism upon transport of the cassette from said compartment of said magazine to the operative position in said machine by said loading apparatus.

2. Cassette changer apparatus according to any of claims 1 including a magazine having multiple compartments, > means mounting said magazine for translation to locate any of said compartments at a loading position of said loading apparatus,
>
> drive means for rotating and for translating said magazine, and
>
> control means for operating said drive means to selectively rotate and translate said magazine to locate one of said compartments at said loading position and one of the sides of a cassette in said compartment in position for use with said mechanism.

3. Cassette changer apparatus according to claim 1, a stud projecting below said turntable, a set of decelleration and stop switches mounted for actuation by said stud adjacent each end of its movement, and circuit means including a drive motor and said decelleration and stop switches to slow-down and stop said drive motor and limit rotation of said turntable to 180°.

4. Cassette changer apparatus according to claim 1, said chassis having an aperture through which a cassette passes while being transported by said loading apparatus between said magazine and said operative position, and said cassette changer apparatus including circular rails mounted on said chassis under the turntable terminating on each side of said aperture for maintaining the cassette at a storage level above the aperture during rotary movement of said magazine.

5. Cassette changer apparatus according to claim 4, said aperture in said chassis including a semi-circular segment beneath said turntable, a stud projecting below said turntable into said segment, a set of decelleration and stop switches mounted in said segment for actuation by said stud adjacent each end of its movement limited by the edges of said segment, and circuit means including a drive motor for said turntable operated responsive to the actuation of said decelleration and stop switches to slow-down and stop said drive motor and limit rotation of said turntable to 180°.

6. Cassette changer apparatus according to claim 1, said magazine including multiple compartments for a plurality of cassettes, and means for supporting said magazine for translation on said turntable to locate cassettes therein in position for transport by said loading apparatus.

7. Cassette changer apparatus according to claim 6, said chassis having an aperture through which a cassette passes while being transported by said loading apparatus between said magazine and said operative position, said means mounting said magazine for translation on said turntable including parallel rails located on each side of said magazine and guiding said magazine to locate any one of its compartments therein aligned with said aperture in said chassis.

8. Cassette changer apparatus according to claim 7, further including drive means mounted on said turntable for translating said magazine guided by said side rails.

9. Cassette changer apparatus according to claim 8, said drive means on said turntable including a motor, a pinion driven by said motor, and a rack carried by said magazine engaged by said pinion for translating said magazine upon rotation of said motor.

10. Cassette changer apparatus according to claim 9, wherein one revolution of said pinion corresponds exactly to the distance for translating said magazine from compartment to compartment aligned with said aperture.

11. Cassette changer apparatus according to claim 10, further including a wheel rotatable with said pinion and having a locking aperture in its circumference, a locking plunger movable into said locking aperture, said aperture being located to receive said plunger when any one of said compartments is aligned with said chassis aperture, for locating the magazine exactly with one of its compartments in alignment with said aperture in the chassis.

12. Cassette changer appratus according to any of claims 1 or 3, said machine having a chassis provided with an aperture for transport of a cassette to operative components of the machine slightly larger than the front edge of a cassette, means operating said loading apparatus for transporting a cassette between one of said magazine compartments and said operative position through said aperture, said magazine including a plurality of compartments, and means mounting said magazine for translation to align any one of said compartments with said aperture.

13. Cassette changer apparatus according to claim 12, said magazine including walls between said compartments, said apparatus including means for translating said magazine and locating said magazine with a pair of adjacent compartments aligned with said aperture and the wall between said compartments centered over the aperture, before rotating the magazine for inverting a cassette therein, to prevent cassettes in said magazine from falling into the aperture during rotation of said magazine.

14. Cassette changer apparatus according to claim 12, including means for translating said magazine and locating said magazine centered on said turntable before rotation thereof for inverting a cassette in said magazine.

15. Cassette changer apparatus according to claim 12, said loading apparatus having a mechanism for carrying cassettes through said aperture, and means for lowering said mechanism clear of said turntable before rotating the turntable to invert a cassette.

16. Cassette changer apparatus according to any of claims 4, 7 or 8, said loading apparatus having a mechanism for carrying cassettes through said aperture, and means for lowering said mechanism clear of said turntable before rotating the turntable to invert a cassette.

17. In a machine having mechanism for recording and/or playing back information on magnetic tape contained in a cassette upon movement of the tape in a single direction, said machine having cassette loading apparatus, the improvement comprising cassette changer apparatus including:

> a magazine having multiple compartments for storing cassettes immediately above said loading apparatus, said loading apparatus including means for transporting a cassette vertically to remove it from and to return it to a loading position in said magazine,
>
> means mounting said magazine for rotation one-half revolution about a vertical axis to invert a cassette therein and position both sets of recording tracks on tape in the cassette for use with said mechanism, and
>
> means mounting said magazine for translation horizontally to locate any compartment and cassette therein in said loading position.

18. Cassette changer apparatus according to claim 17, said machine having a chassis provided with an aperture through which a cassette is transported by said loading mechanism;

said magazine having walls between said compartments;

said apparatus including means for translating and for rotating said magazine; and said apparatus including means for locating said magazine with a wall between adjacent compartments positioned over the aperture to prevent cassettes in said magazine from falling into the aperture during rotation of said magazine.

19. In a machine having mechanism for recording and/or playing back information on magnetic tape contained in a cassette upon movement of the tape in a single direction, said machine having cassette loading apparatus, the improvement comprising cassette changer apparatus including:

a magazine having multiple compartments for storing cassettes immediately adjacent said loading apparatus, said loading apparatus including means for transporting a cassette to remove it from and return it to a loading position in said magazine, means mounting said magazine for rotation one-half revolution to invert a cassette therein and position both sets of recording tracks on tape in the cassette for use with said mechanism, and means mounting said magazine for translation to locate any compartment and cassette therein in said loading position.

20. In a machine having mechanism for recording and/or playing back information on magnetic tape contained in a cassette upon movement of the tape in a single direction, said machine having cassette loading means, the improvement comprising cassette changer apparatus including:

a magazine having multiple compartments for storing cassettes immediately above said loading apparatus, said loading means including transport mechanism movable vertically by drive means to remove a cassette from and return it to a loading position in said magazine supported on said transport mechanism, means mounting said magazine for rotation one-half revolution about a vertical axis to invert a cassette therein and position both sets of recording tracks on tape in the cassette for use with said mechanism, means mounting said magazine for translation to locate any compartment and cassette therein in said loading position, drive means for rotating and for translation said magazine, and control means connected to said magazine rotating drive means, said magazine translating drive means and said transport drive means, for operating said transport drive means to lower said transport mechanism clear of said magazine before said magazine is rotated, and to return said transport mechanism to said loading position before said magazine is translated to locate any compartment and cassette in said loading position.

21. Cassette changer apparatus according to claim 17, 19 or 20 including:

coded elements carried on the outer surface of said magazine and representing in code the locations of the various compartments thereof, pick-up means mounted to scan said band and read said code upon translation of said magazine, and means operated responsive to the output from said pick-up means to control said translation means to locate a selected compartment in said transport position.

* * * * *